United States Patent
Bex et al.

(10) Patent No.: US 9,260,085 B2
(45) Date of Patent: Feb. 16, 2016

(54) WIPER BLADE ADAPTER, IN PARTICULAR FOR A MOTOR VEHICLE WINDSHIELD WIPER DEVICE

(75) Inventors: Koen Bex, Jeuk (BE); Dirk Herinckx, Linter (BE); Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 13/976,915

(22) PCT Filed: Nov. 18, 2011

(86) PCT No.: PCT/EP2011/070419
§ 371 (c)(1),
(2), (4) Date: Sep. 3, 2013

(87) PCT Pub. No.: WO2012/089407
PCT Pub. Date: Jul. 5, 2012

(65) Prior Publication Data
US 2013/0333140 A1    Dec. 19, 2013

(30) Foreign Application Priority Data

Dec. 27, 2010  (DE) .......... 10 2010 064 164

(51) Int. Cl.
*B60S 1/52*  (2006.01)
*B60S 1/38*  (2006.01)
*B60S 1/40*  (2006.01)

(52) U.S. Cl.
CPC .. *B60S 1/524* (2013.01); *B60S 1/40* (2013.01); *B60S 1/3862* (2013.01)

(58) Field of Classification Search
CPC .......... B60S 1/524; B60S 1/52; B60S 1/3862; B60S 1/46
USPC ............. 15/250.04, 250.03; 239/284.1, 284.2
See application file for complete search history.

(56) References Cited

U.S. PATENT DOCUMENTS

| | | | | |
|---|---|---|---|---|
| 3,913,167 | A * | 10/1975 | Frigon ........................ | 15/250.04 |
| 3,940,068 | A * | 2/1976 | Mohnach et al. .......... | 239/284.1 |
| 4,782,547 | A * | 11/1988 | Mohnach ................... | 15/250.04 |
| 6,442,788 | B1 * | 9/2002 | Fleischer ................... | 15/250.04 |
| 2003/0009841 | A1 * | 1/2003 | Sato ........................... | 15/250.04 |
| 2007/0089257 | A1 * | 4/2007 | Harita et al. ............... | 15/250.04 |
| 2007/0143947 | A1 * | 6/2007 | Harita et al. ............... | 15/250.04 |

(Continued)

FOREIGN PATENT DOCUMENTS

| | | |
|---|---|---|
| CN | 201140704 | 10/2008 |
| CN | 101312861 | 11/2008 |

(Continued)

OTHER PUBLICATIONS

FR2754508A1 (machine translation), 1998.*

(Continued)

*Primary Examiner* — Monica Carter
*Assistant Examiner* — Andrew A Horton
(74) *Attorney, Agent, or Firm* — Michael Best & Friedrich LLP

(57) ABSTRACT

The invention relates to a wiper blade adapter, in particular for a motor vehicle windshield wiper device, comprising a main body (12). According to the invention, the wiper blade adapter comprises a spraying unit (10), which is arranged on the main body (12) and designed to spray a liquid onto a motor vehicle windshield (64).

17 Claims, 4 Drawing Sheets

(56) References Cited

U.S. PATENT DOCUMENTS

| | | | |
|---|---|---|---|
| 2007/0226938 A1* | 10/2007 | Yon | 15/250.04 |
| 2008/0155776 A1* | 7/2008 | Harita | 15/250.04 |
| 2008/0216274 A1 | 9/2008 | Egner-Walter et al. | |
| 2012/0066857 A1* | 3/2012 | Webert | 15/250.04 |
| 2012/0090123 A1* | 4/2012 | Caillot et al. | 15/250.04 |

FOREIGN PATENT DOCUMENTS

| | | | |
|---|---|---|---|
| DE | 102005060617 | 6/2007 | |
| EP | 1099609 | 5/2001 | |
| FR | 2747090 | 10/1997 | |
| FR | 2754508 A1 * | 4/1998 | B60S 1/52 |
| FR | 2756528 A1 * | 6/1998 | B60S 1/52 |
| FR | 2761323 A1 * | 10/1998 | B60S 1/52 |
| FR | 2795695 | 1/2001 | |
| FR | 2902063 | 12/2007 | |
| FR | 2923785 | 5/2009 | |
| FR | 2933930 | 1/2010 | |

OTHER PUBLICATIONS

FR2761323A1 (machine translation), 1998.*
FR2795695 (machine translation), 2001.*
International Search Report for Application No. PCT/EP2011/070419 dated Feb. 15, 2012 (3 pages).

* cited by examiner

WIPER BLADE ADAPTER, IN PARTICULAR FOR A MOTOR VEHICLE WINDSHIELD WIPER DEVICE

BACKGROUND OF THE INVENTION

Wiper blade adapters are already known from the motor vehicle windshield wiper device sector. The wiper blade adapters are provided for coupling a wiper blade to a wiper arm adapter of a wiper arm.

SUMMARY OF THE INVENTION

The invention is based on a wiper blade adapter, in particular for a motor vehicle windshield wiper device, comprising a basic body.

It is proposed that the wiper blade adapter has a spraying unit which is arranged on the basic body and is provided for spraying a liquid onto a motor vehicle windshield, thus enabling the liquid to be distributed particularly uniformly over the motor vehicle windshield. A "spraying unit" in this context is to be understood as meaning, in particular, a unit which is provided for spraying liquids onto a motor vehicle windshield for cleaning purposes. "Provided" is to be understood as meaning, in particular, specially designed and/or equipped.

Furthermore, it is proposed that the spraying unit is designed so as to be detachable from the basic body, thus enabling the spraying unit to be simply interchangeable. "Detachable" in this context is to be understood as meaning, in particular, "non-destructively separable". The wiper blade adapter is particularly advantageously detachable and/or fastenable without a tool.

If the wiper blade adapter has at least one latching means which is provided for connecting the basic body to the spraying unit, the spraying unit can be fitted particularly rapidly to the basic body. A "latching means" in this context is to be understood as meaning, in particular, a spring-elastic means for producing a latching connection, said means being provided so as to be deflected elastically during installation.

In a further refinement of the invention, it is proposed that the latching means is formed in one piece with the basic body, thereby enabling the latching means to be produced particularly cost-effectively. "In one piece" is to be understood as meaning, in particular, integrally bonded, as, for example, by a welding process and/or adhesive-bonding process, etc., and, particularly advantageously, integrally formed, as by monobloc production and/or production by injection molding using one or more components.

If the wiper blade adapter has at least one first longitudinal guide element which is provided for guiding the spraying unit during installation, the spraying unit can be fitted to the basic body in a particularly simple manner. A "longitudinal guide element" in this context is to be understood as meaning, in particular, an element which is provided for guiding a component in a longitudinal direction. The longitudinal guide element is preferably formed in one piece with the basic body of the wiper blade adapter. A "longitudinal direction" in this context is to be understood as meaning, in particular, a direction which runs parallel to a main longitudinal extent of an element. In this context, a "main longitudinal extent" is to be understood as meaning, in particular, a greatest possible extent. An "extent" of an element in this context is to be understood as meaning, in particular, a maximum distance between two points of a perpendicular projection of the element onto a plane.

Furthermore, it is proposed that the wiper blade adapter has a second longitudinal guide element, wherein the first and the second longitudinal guide elements are arranged on two opposite sides of the basic body, thus enabling additional possibilities of using the wiper blade adapter to be achieved.

If the spraying unit has at least two spraying openings which are provided for spraying the liquid in at least two different spraying directions, the liquid can be distributed particularly well over the motor vehicle windshield.

A distribution of liquid over the motor vehicle windshield can be further improved if the at least two spraying directions enclose an angle of at least 30°. An "angle" in this context is to be understood as meaning, in particular, an acute angle and/or a right angle and/or an obtuse angle.

If, in at least one operating state, at least one spraying direction encloses an angle of at least 70° with the motor vehicle windshield, a liquid can be applied to the motor vehicle windshield with particular precision.

BRIEF DESCRIPTION OF THE DRAWINGS

Further advantages emerge from the description below of the drawing. The drawing illustrates an exemplary embodiment of the invention. The drawings, the description and the claims contain numerous features in combination. A person skilled in the art will expediently also consider the features individually and combine them to provide useful further combinations.

In the drawings.

DETAILED DESCRIPTION

Figure 1:
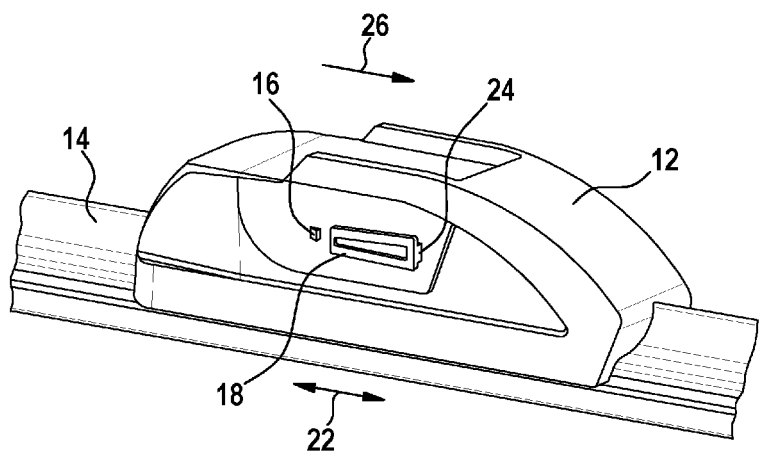
FIG. 1 shows a perspective view of a basic body of a wiper blade adapter with a wiper blade.
Figure 2:
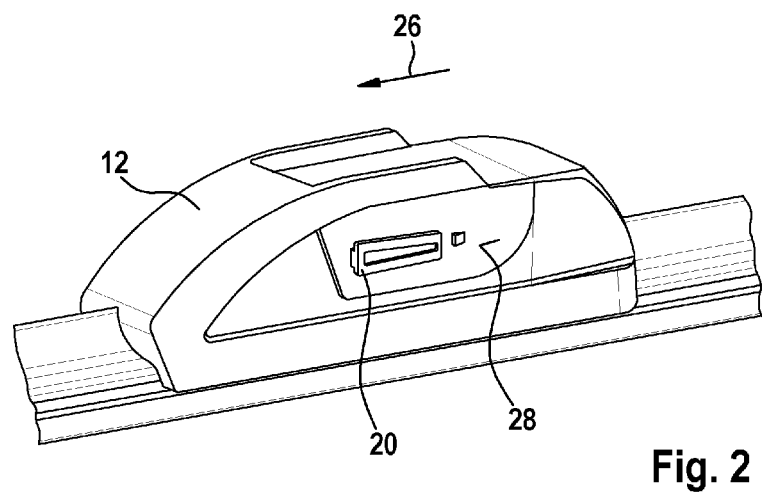
FIG. 2 shows a perspective view of the rear side of the basic body.

FIG. 1 shows a basic body 12 according to the invention of a wiper blade adapter for a motor vehicle windshield wiper device, said basic body being connected to a wiper blade 14 in a manner familiar to a person skilled in the art.

The wiper blade adapter furthermore has a latching means 16 which is arranged on the basic body 12. The latching means 16 is produced together with the basic body 12 by injection molding and is therefore formed in one piece therewith. The latching means 16 has a barb-like shape. Furthermore, the latching means 16 can be elastically deflected.

Furthermore, a first longitudinal guide element 18, the main extent of which extends in a longitudinal direction 22, is arranged on the basic body 12. The longitudinal direction 22 runs parallel to a main longitudinal extent of the basic body 12 of the wiper blade adapter. The longitudinal guide element 18 surrounds a t shaped guide rail 24. The guide rail 24 changes in width over the longitudinal direction 22. In this case, the guide rail 24 steadily increases linearly in width in an installation direction 26. The installation direction 26 runs parallel to the longitudinal direction 22 and describes a direction into which a spraying unit 10 has to be moved relative to the basic body 12 in order to enter into a form-fitting connection with the longitudinal guide element 18.

The wiper blade adapter has a second longitudinal guide element 20, wherein the first and the second longitudinal guide elements 18, 20 are arranged on two opposite sides 27, 28 of the basic body 12. The first and the second longitudinal guide elements 18, 20 are formed mirror-symmetrically with respect to each other. The installation direction 26 is the same for both longitudinal guide elements 18, 20. Furthermore, a second latching means 30 which is formed in one piece with the basic body 12 is arranged on the opposite side 28. A spraying unit 10 can be attached on one side or on the other, opposite side 28, depending on what is required for use.

Figure 3:
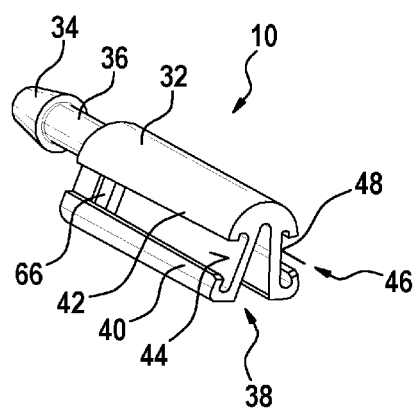
FIG. 3 shows a perspective view of a spraying unit of the wiper blade adapter.

FIG. 3 shows the spraying unit 10 according to the invention in a perspective view. The spraying unit 10 is provided in particular for spraying a liquid onto a motor vehicle windshield 64. The spraying unit 10 is designed so as to be detachable from the basic body 12 and comprises a spraying body 32 produced by injection molding. Furthermore, the spraying unit 10 has a conically tapering connecting element 34 which is provided to be coupled to a hose (not illustrated) through which a liquid for cleaning the motor vehicle windshield can flow.

The connecting element 34 is formed in one piece with the spraying body 32 via an intermediate piece 36. A liquid channel (not illustrated) extends through the connecting element 34, the intermediate piece 36 and the spraying body 32. The spraying unit 10 has a t shaped receiving region 38 which is adjoined by two flanks 40, 42 and a guide surface 44. Furthermore, the spraying unit 10 is of mirror-symmetrical design. A second identical receiving region 46 is therefore located on an opposite side 48.

Furthermore, the spraying unit 10 comprises a latching body 66 which is arranged within the receiving region 38. The latching body 66 is adjacent to the flanks 40, 42 and to the guide surface 44. The latching body 66 has an asymmetrical wedge shape.

Figure 4:
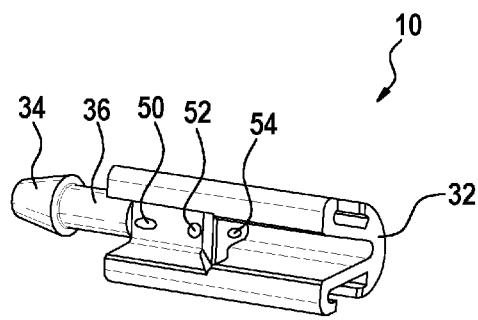
FIG. 4 shows a further perspective view of the spraying unit according to FIG. 3.

A further perspective view of the spraying unit 10 is shown in FIG. 4. A first, second and third spraying opening 50, 52, 54 are arranged on a lower side of the spraying body 32. The spraying openings 50, 52, 54 are adjacent to the liquid channel in the spraying body 32. The spraying openings 50, 52, 54 are arranged consecutively in a line.

Figure 5:
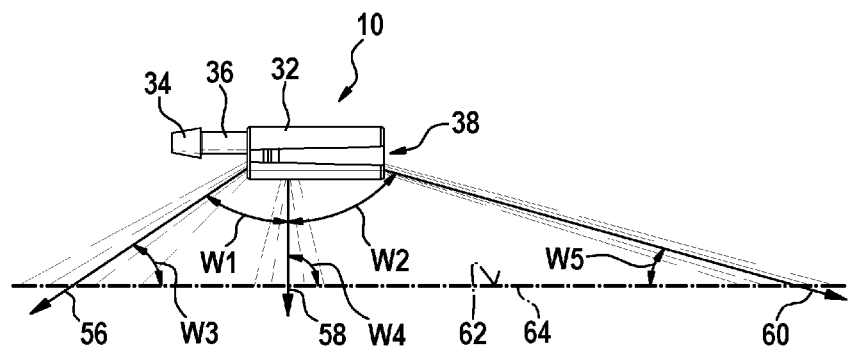
FIG. 5 shows a side view of the spraying unit according to FIG. 3 and of a motor vehicle windshield in an operating state.

Immediately in front of the spraying openings 50, 52, 54, the liquid channel has different directions of extent which, in an operating state, direct a liquid flowing through the spraying body 32 in three different spraying directions 56, 58, 60 (FIG. 5). The spraying directions 56, 58, 60 show main spraying directions in which the liquid is substantially directed. During spraying of a liquid, a deviation from the spraying directions 56, 58, 60 of maximally 20° in each case occurs.

The first and second spraying directions 56, 58 enclose an angle W1 of 56°. The second and third spraying directions 58, 60 enclose an angle W2 of 74°. FIG. 5 furthermore schematically shows a surface 62 of the motor vehicle windshield 64. The surface 62 is shown in simplified form as a planar surface.

In an operating state, the first spraying direction 56 encloses an angle W3 of 33° with the surface 62. The second spraying direction 58 encloses an angle W4 of 90°, i.e. a right angle, with the surface 62. The third spraying direction 60 encloses an angle W5 of 16° with the surface 62.

Figure 6:
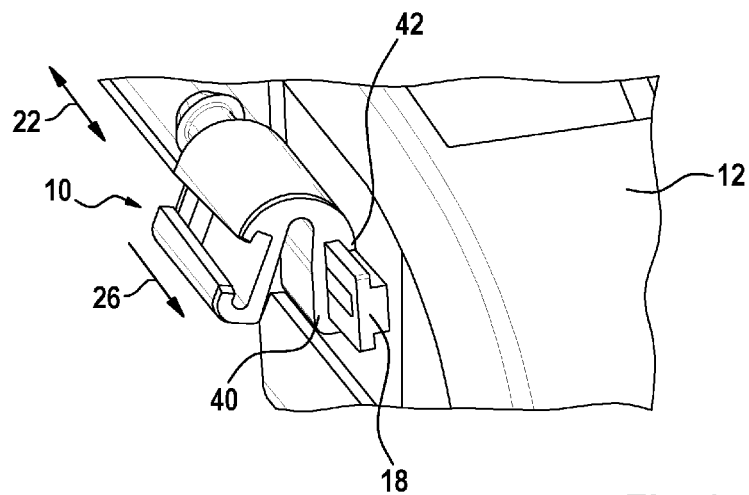
FIG. 6 shows a perspective view of a first installation step of the wiper blade adapter according to FIG. 1.

In a first installation step (FIG. 6), the spraying unit 10 is pushed onto the longitudinal guide element 18. Alternatively, said spraying unit can also be pushed onto the second longitudinal guide element 20. In this case, the longitudinal guide element 18 guides the spraying unit 20 in the installation direction 26. The receiving region 38 of the spraying body 32 forms a form-fitting connection with the longitudinal guide element 18. The flanks 40, 42 here reach behind the t shaped guide rail 24. The guide surface 44 is adjacent to the guide rail 24. A movement of the spraying unit 10 relative to the basic body 12 is possible only in the longitudinal direction 22.

Continued pushing of the spraying unit 10 on the longitudinal guide element 18 causes the latching means 16 to be elastically deflected from a starting position by the latching body 66. In a fitted state, the latching means 16 moves elastically back into the starting position and bears in a form-fitting manner against the latching body 66. It is not possible to continue to push the spraying unit 10 because of the width of the guide rail 24 increasing in the installation direction.

In the fitted state, the guide rail 24 forms a form-fitting connection in the entire receiving region 38 of the spraying unit 10. An unintentional movement of the spraying unit 10 relative to the basic body 12 in the longitudinal direction 22 is not possible because of the changed width of the guide rail 24 and because of the latching means 16 and the latching means 30.

Figure 7:
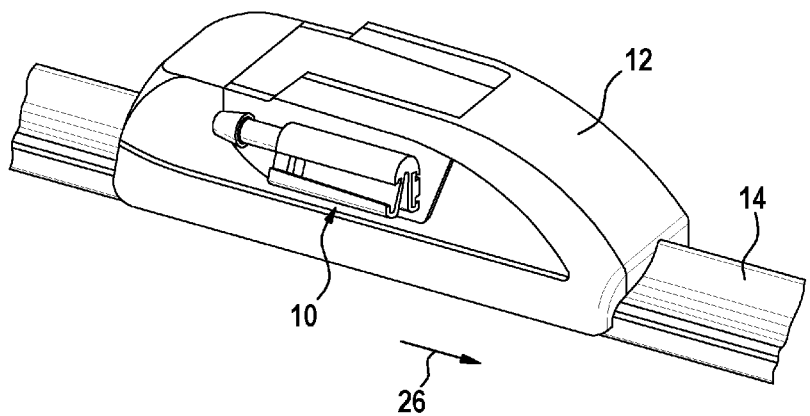
FIG. 7 shows a perspective view of the wiper blade adapter according to FIG. 1 in a fitted state.

FIG. 7 shows the wiper blade adapter in a fitted state. The spraying unit 10 is connected to the basic body 12. In order to detach the spraying unit 10 again from the basic body 12, the spraying unit 10 is pressed counter to the installation direction 26. The latching means 16 is deflected out of the starting position thereof by the latching body 66 of the spraying unit 10. The spraying unit 10 can then be pushed back and detached.

What is claimed is:

1. A wiper blade adapter, comprising a basic body (12), characterized by a spraying unit (10) which is arranged on the basic body (12) and is provided for spraying a liquid onto a motor vehicle windshield (64), wherein at least one latching means (16) is disposed on the basic body (12) for coupling the basic body (12) to the spraying unit (10), the at least one latching means (16) having a barb-like shape configured to be elastically deflected by the spraying unit (10) while the spraying unit (10) is being coupled to the basic body (12), wherein the basic body (12) extends along a longitudinal direction (22), wherein the spraying unit (10) includes a latching body (66) having a wedge shape, wherein the latching body (66) is configured to engage the at least one latching means (16) and press the at least one latching means (16) inwardly toward the basic body (12) by sliding the spraying unit (10) along the longitudinal direction (22), wherein the basic body (12) includes a guide rail (24) that has a varying width along a longitudinal direction (22) of the basic body (12), wherein the spraying unit (10) includes a receiving region (38) configured to slide over the guide rail (24) along the longitudinal direction (22), and wherein both the guide rail (24) and the receiving region (38) are t-shaped.

2. A wiper blade adapter as claimed in claim 1, characterized in that the spraying unit (10) is detachable from the basic body (12).

3. The wiper blade adapter as claimed in claim 1, characterized in that the at least one latching means (16) is formed in one piece with the basic body (12).

4. The wiper blade adapter as claimed in claim 1, characterized by at least one first longitudinal guide element (18) which is provided for guiding the spraying unit (10) during installation.

5. The wiper blade adapter as claimed in claim 4, characterized by a second longitudinal guide element (20), wherein the first and the second longitudinal guide elements (18, 20) are arranged on two opposite sides of the basic body (12).

6. The wiper blade adapter as claimed in claim 1, characterized in that the spraying unit (10) has at least two spraying openings (50, 52, 54) which are provided for spraying the liquid in at least two different spraying directions (56, 58, 60).

7. The wiper blade adapter as claimed in claim 6, characterized in that the at least two spraying directions (56, 58) enclose an angle (W1) of at least 30°.

8. The wiper blade adapter at least as claimed in claim 6, characterized in that, in at least one operating state, at least one spraying direction (58) encloses an angle (W4) of at least 70° with the motor vehicle windshield (64).

9. A wiper blade adapter as claimed in claim 1, characterized in that the adaptor is configured to be connected to a wiper blade.

10. A wiper blade adapter as claimed in claim 9, characterized in that the adaptor is configured to be connected to a wiper arm of a windshield wiper.

11. The wiper blade adapter as claimed in claim 1, wherein the guide rail (24) and the at least one latching means (16) are spaced from one another along the longitudinal direction.

12. The wiper blade adapter as claimed in claim 1, wherein the receiving region (38) is defined by a guide surface (42) and two flanks (40, 42), wherein the two flanks (40, 42) extend toward one another, and wherein the latching body (66) is disposed on the guide surface (42).

13. A wiper blade adapter comprising a basic body (12) and a spraying unit (10) which is arranged on the basic body (12) and is configured to spray a liquid onto a motor vehicle windshield (64), wherein the basic body (12) includes a guide rail (24) that has a varying width along a longitudinal direction (22) of the basic body (12), wherein the spraying unit (10) includes a receiving region (38) configured to slide over the guide rail (24) along the longitudinal direction (22), wherein both the guide rail (24) and the receiving region (38) are t-shaped, wherein the receiving region (38) is defined by two flanks (40, 42) and a guide surface (44), wherein the two flanks extend toward one another, and wherein the spraying unit (10) includes a latching body 66 having a wedge shape, the latching body (66) extending from the guide surface (44) and disposed between the guide surface and the two flanks (40, 42).

14. The wiper blade adapter as claimed in claim 13, wherein the spraying unit (10) has at least two spraying openings (50, 52, 54) which are provided for spraying the liquid in at least two different spraying directions (56, 58, 60), wherein the at least two spraying directions (56, 58) enclose an angle (W1) of at least 30°, and wherein, in at least one operating state, at least one spraying direction (58) encloses an angle (W4) of at least 70° with the motor vehicle windshield (64).

15. A wiper blade adapter as claimed in claim 13, wherein the adaptor is configured to be connected to a wiper blade.

16. A wiper blade adapter as claimed in claim 15, wherein the adaptor is configured to be connected to a wiper arm of a windshield wiper.

17. A wiper blade adapter as claimed in claim 13, further comprising at least one latching means (16) disposed on the basic body (12) for coupling the basic body (12) to the spraying unit (10), wherein the at least one latching means (16) is spaced apart from the guide rail (24) along the longitudinal direction (22).

* * * * *